(12) United States Patent
Forget et al.

(10) Patent No.: US 11,332,080 B2
(45) Date of Patent: May 17, 2022

(54) FIXING PIECE COMPRISING A FIBROUS FIXING STRUCTURE, AND ASSOCIATED ASSEMBLY AND METHOD

(71) Applicant: FAURECIA AUTOMOTIVE INDUSTRIE, Nanterre (FR)

(72) Inventors: Johnny Forget, Mouzon (FR); Rémi Bouton, Raucourt-Et-Flaba (FR); Xavier Bathelier, Saint-Pierremont (FR)

(73) Assignee: FAURECIA AUTOMOTIVE INDUSTRIE, Nanterre (FR)

( * ) Notice: Subject to any disclaimer, the term of this patent is extended or adjusted under 35 U.S.C. 154(b) by 0 days.

(21) Appl. No.: 16/944,128

(22) Filed: Jul. 30, 2020

(65) Prior Publication Data

US 2021/0031706 A1    Feb. 4, 2021

(30) Foreign Application Priority Data

Jul. 31, 2019  (FR) ..................... 19 08766

(51) Int. Cl.
*B60P 7/08*     (2006.01)
*B60R 13/02*    (2006.01)
*B60R 7/02*     (2006.01)

(52) U.S. Cl.
CPC ............ *B60R 13/02* (2013.01); *B60P 7/0892* (2013.01); *B60R 7/02* (2013.01); *Y10T 428/24008* (2015.01)

(58) Field of Classification Search
None
See application file for complete search history.

(56) References Cited

U.S. PATENT DOCUMENTS

| 3,346,775 | A | | 10/1967 | Kirk |
| 5,193,464 | A | * | 3/1993 | Morden ................ B65D 19/40 |
| | | | | 108/56.3 |
| 5,601,271 | A | | 2/1997 | Janowski et al. |
| 6,702,532 | B1 | | 3/2004 | Throener |
| 7,306,416 | B1 | * | 12/2007 | Arico .................... B60P 7/0892 |
| | | | | 410/102 |
| 2014/0093323 | A1 | | 4/2014 | Malmstrom |
| 2018/0282919 | A1 | | 10/2018 | Bathelier et al. |

FOREIGN PATENT DOCUMENTS

| FR | 3041001 A1 | 3/2017 |
| KR | 20180063030 A | 6/2018 |
| WO | WO2011088528 A1 | 7/2011 |

OTHER PUBLICATIONS

French Search Report corresponding to French Application No. FR 1908766, dated Feb. 17, 2020, 2 pages.

* cited by examiner

*Primary Examiner* — Alexander S Thomas
(74) *Attorney, Agent, or Firm* — Reising Ethington P.C.

(57) ABSTRACT

A fixing piece, intended to immobilize at least one object on a fibrous covering in a motor vehicle, the fixing piece having a plate defining an upper surface and a lower surface configured to be oriented toward the fibrous covering, the upper surface being intended to come into contact with the object, and at least one object retaining stop protruding from the upper surface. The retaining stop is configured to maintain the object horizontally. The lower surface has a fibrous fixing structure configured to fix the fixing piece on the fibrous covering.

12 Claims, 5 Drawing Sheets

FIXING PIECE COMPRISING A FIBROUS FIXING STRUCTURE, AND ASSOCIATED ASSEMBLY AND METHOD

TECHNICAL FIELD

The present invention relates to a fixing piece, intended to immobilize at least one object on a fibrous covering in a motor vehicle.

BACKGROUND

To fix an object on an inner covering of a motor vehicle, it is known to use additional components, for example a holding strap, as fixing piece to retain the object between the strap and the inner covering.

However, such a fixing piece is not fully satisfactory. Indeed, the additional components for fixing objects increase the design and manufacturing complexity of motor vehicles as well as the cost. Additionally, the fixing of the objects by the additional components often requires several handling steps.

SUMMARY

One aim of the present invention is to provide a fixing piece that makes it possible to simplify the fixing of an object on the fibrous inner covering, in particular in the storage compartment of the vehicle.

To that end, the invention relates to a fixing piece, intended to immobilize at least one object on a fibrous covering in a motor vehicle, characterized by:
- a plate defining an upper surface and a lower surface configured to be oriented toward the fibrous covering, the upper surface being intended to come into contact with the object, and
- at least one object retaining stop protruding from the upper surface, the or each retaining stop being configured to maintain the object horizontally,
- the lower surface comprising a fibrous fixing structure configured to fix the fixing piece on the fibrous covering.

According to specific embodiments of the invention, the fixing piece further has one or more of the following features, considered alone or according to any possible combination(s):
- the retaining stop comprises a hollow wall having an upper face defining at least one orifice;
- the lower surface comprises a rim defining a protruding region of the stop, the fibrous fixing structure being arranged on the protruding region.

The invention also relates to an assembly for storing objects in a motor vehicle, comprising:
- a fibrous covering, intended to form an object support surface;
- a fixing piece as described above, the lower surface of the fixing piece being fixed on the fibrous covering; and
- at least one object kept in position by the retaining stop of the fixing piece.

According to specific embodiments of the invention, the storage assembly further has one or more of the following features, considered alone or according to any possible combination(s):
- the fibrous covering comprises a plurality of first fibers, and the fibrous fixing structure comprises a plurality of second fibers, the first and second fibers being configured to be intertwined to fix the fixing piece on the fibrous covering;
- the density of the first and second fibers is between 0.05 g/cm$^3$ and 1.5 g/cm$^3$;
- the height of the first and second fibers is between 2 mm and 5 mm;
- the linear density of the first and second fibers is between 6.7 dtex and 35 dtex;
- the first and second fibers are identical;
- the fibrous covering comprises a substrate layer, the first fibers being fixed on the substrate layer, the first fibers, respectively the second fibers, being substantially perpendicular to the substrate layer, respectively to the lower surface of the plate;
- the fibrous covering and the fibrous fixing structure are structures comprising intertwined fibrous loops and hooks; and
- the storage assembly comprises a plurality of fixing pieces that are independent of one another, the fixing pieces defining a receiving space, the object being intended to be arranged in the receiving space and in direct contact with the retaining stop of the fixing pieces.

The invention also relates to a kit for immobilizing at least one object, the kit comprising:
- a fibrous covering comprising a plurality of first fibers,
- a fibrous fixing structure comprising a plurality of second fibers, the first and second fibers being configured to be intertwined in order to ensure fixing of the object.

According to specific embodiments of the invention, the immobilization kit further has one or more of the following features, considered alone or according to any possible combination(s):
- the density of the first and second fibers is between 0.05 g/cm$^3$ and 1.5 g/cm$^3$;
- the height of the first and second fibers is between 2 mm and 5 mm;
- the linear density of the first and second fibers is between 6.7 dtex and 35 dtex.

Advantageously, the fibrous fixing structure is intended to be mounted secured to an object to be fixed or to an object fixing piece and the fibrous covering is mounted secured to a support surface of the object, in particular a motor vehicle bottom.

The invention further relates to a method for immobilizing at least one object on a fibrous covering in a motor vehicle, the method comprising the following steps:
- providing at least one fixing piece, the fixing piece comprising:
  - a plate defining an upper surface and a lower surface, the lower surface comprising a fibrous fixing structure;
  - at least one object retaining stop protruding from the upper surface;
- orienting the lower surface toward the fibrous covering;
- fixing each fixing piece on the fibrous covering by applying the fibrous structure on the fibrous covering; and
- keeping the object horizontal on the fibrous covering by contact of the object with the upper surface of the plate and the or each retaining stop.

According to specific embodiments of the invention, the immobilization method further has one or more of the following features, considered alone or according to any possible combination(s):
- the fibrous covering comprises a plurality of first fibers, the fibrous fixing structure comprising a plurality of second fibers;
- it comprises immobilizing at least one fixing piece on the fibrous covering by intertwining of the first and second fibers;

it comprises providing a plurality of fixing pieces and arranging them on the fibrous covering in order to define a receiving space between the retaining stops, it comprises arranging the object in the receiving space, the object being in direct contact with the retaining stop of the fixing pieces, so as to keep the object on the fibrous covering.

BRIEF DESCRIPTION OF THE DRAWINGS

Other features and advantages of the invention will appear upon reading the following description, provided solely as an example and done in reference to the appended drawings, in which.

DETAILED DESCRIPTION

In the rest of this document, the orientations are generally the typical orientations of a motor vehicle. Thus, the terms "horizontal," "vertical," "upper," "lower," "above," "below" are generally to be understood relative to the normal direction of travel of the motor vehicle and the position of a driver.

Figure 1:
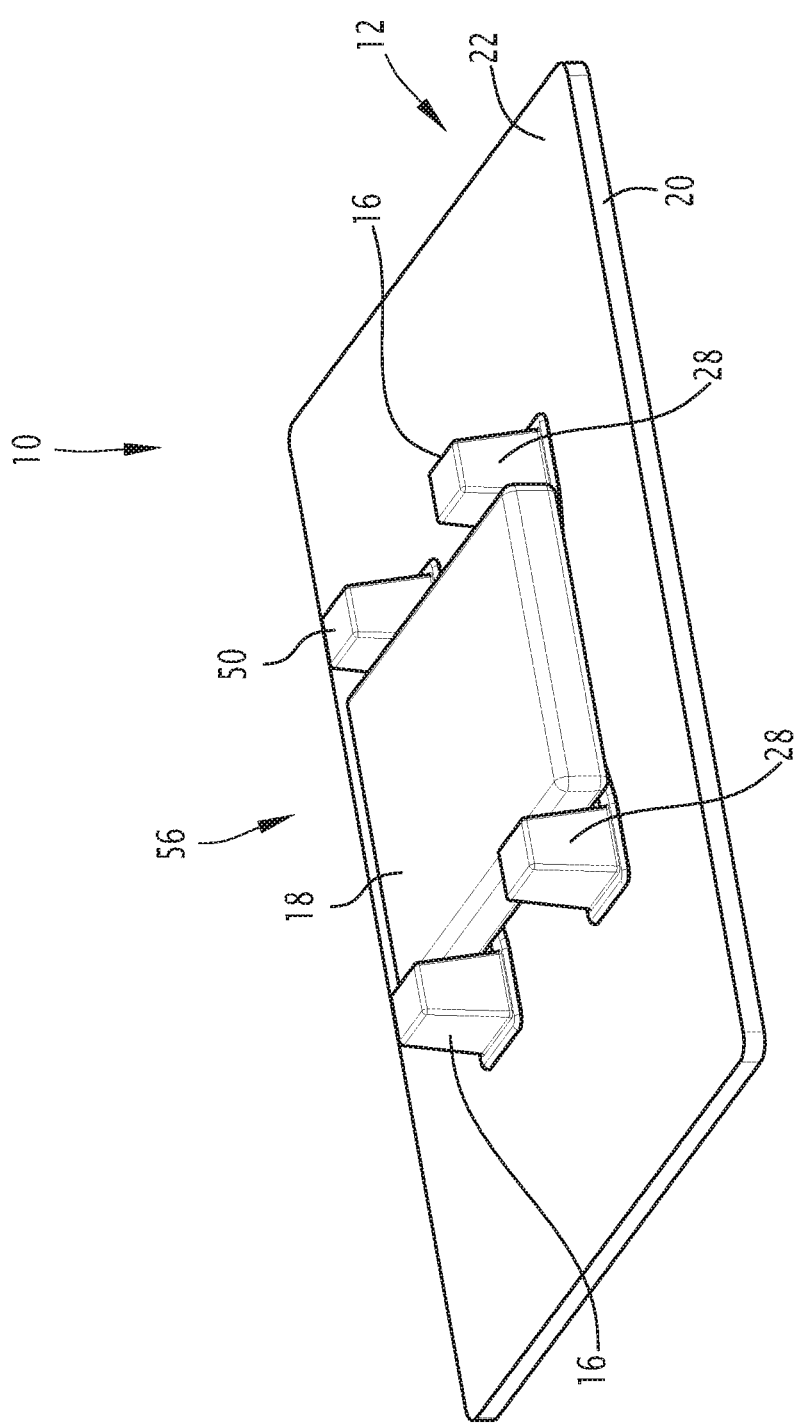
FIG. 1 illustrates, in perspective view, a storage assembly comprising a fixing piece according to a first embodiment of the invention.

FIG. 1 illustrates a storage assembly 10 for objects in a motor vehicle. A storage assembly 10 is for example arranged in a rear storage compartment, a front storage compartment, or a passenger compartment of the motor vehicle.

The storage assembly 10 comprises a fibrous covering 12, forming a bearing surface for the or each object 18, at least one fixing piece 16 fixed on the fibrous covering 12, and at least one object 18 kept in position by the fixing piece 16.

The fibrous covering 12 here is arranged at the bottom of the storage compartment or the compartment. It comprises a substrate layer 20 and a plurality of first fibers 22 fixed on the substrate layer 20.

The substrate layer 20 is for example made from a nonwoven textile, for example a needled nonwoven textile. The substrate layer 20 is for example deposited or fixed on the floor of the storage compartment.

The first fibers 22 are substantially perpendicular to the substrate layer 20.

The density of the first fibers 22 is between 0.05 g/cm$^3$ and 1.5 g/cm$^3$.

The height of the first fibers 22 is between 2 mm and 5 mm.

The linear density or the titer of the first fibers 22 is between 6.7 dtex and 35 dtex.

The first fibers 22 are for example made from polyester, in particular polyethylene terephthalate (PET), or polyamide (PA).

The or each fixing piece 16 is intended to immobilize the object 18 on the fibrous covering 12.

The or each fixing piece 16 comprises a plate 26 and at least one object retaining stop 28 that are made in a single integral piece from a thermoplastic material, for example polypropylene (PP), acrylonitrile butadiene styrene (ABS) or polyethylene terephthalate (PET).

The plate 26 defines an upper surface 30 and a lower surface 32. The upper surface 30 is intended to come into contact with the object 18. The lower surface 32 is configured to be oriented toward the fibrous covering 12.

According to one example of the invention, the or each object 18 is in contact with the entire upper surface 30. According to another example of the invention, the or each object 18 is in contact with part of the upper surface 30.

Advantageously, the plate 26 has at least one reinforcing element 34 protruding from the upper surface 30. The reinforcing element 34 is able to reinforce the structure of the upper surface 30.

The lower surface 32 is intended to be fixed on the fibrous covering 12. The lower surface 32 comprises a fibrous fixing structure 36 configured to fix the fixing piece 16 reversibly on the fibrous covering 12.

The fibrous fixing structure 36 comprises a plurality of second fibers 38. The second fibers 38 are substantially perpendicular to the lower surface 32.

In one example, the density of the second fibers 38 is between 0.05 g/cm$^3$ and 1.5 g/cm$^3$.

The height of the second fibers 38 is between 2 mm and 5 mm.

The linear density or the count of the second fibers 38 is between 6.7 dtex and 35 dtex.

The linear density of the first fibers 22 and second fibers 38, and/or the height of the first fibers 22 and second fibers 38 enables the fixing piece 16 to withstand a vertical detachment force and/or a horizontal detachment force exerted thereon. More specifically, the linear density of the first fibers 22 and second fibers 38, and/or the height of the first fibers 22 and second fibers 38, ensures that the fixing piece 16 remains fixed on the fibrous covering 12 when a substantially vertical detachment force corresponding to a pressure of less than 500 Pascal (Pa) is applied on the fixing piece 16.

Indeed, when the linear density of the first fibers 22 and second fibers 38 is less than 6.7 dtex, or the height of the first fibers 22 and second fibers 38 is less than 2 mm, the fixing piece 16 can be detached from the fibrous covering 12 in the presence of disruptions, for example vibrations when the motor vehicle moves over roads.

Advantageously, the first and second fibers 22, 38 are identical, that is to say made from the same material with the same densities, heights, titers. In a variant, the first and second fibers 22, 38 are different.

The fibrous covering 12 and the fibrous fixing structure 36 are for example made using the method described in document FR 3,041,001.

Indeed, in this type of product described in document FR 3,041,001, the fibers are perfectly parallel, which favors the intertwining thereof when two similar products are placed in contact against one another.

The first and second fibers 22, 38 are configured to be intertwined in order to fix the fixing piece 16 on the fibrous covering 12.

Figure 3:
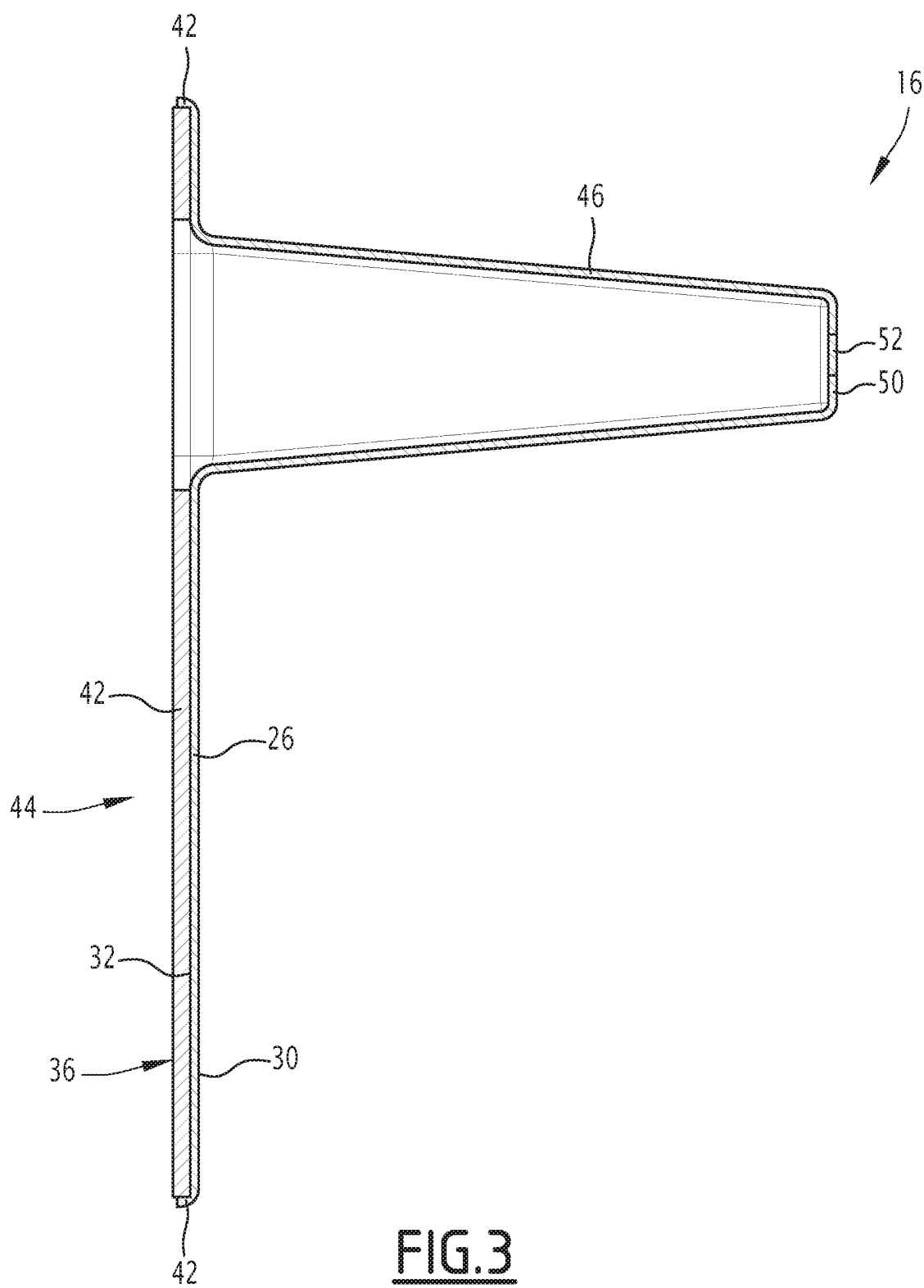
FIG. 3 shows a sectional view along III-III of the fixing piece of FIG. 2.

Advantageously, in reference to FIG. 3, the lower surface 32 comprises a rim 42 defining a protruding region 44 relative to the stop 28. The fibrous fixing structure 36 is arranged on the region 44.

The or each retaining stop 28 protrudes from the upper surface 30. The or each retaining stop 28 is configured to keep the object 18 in the horizontal position. When the object 18 is fixed in the horizontal position, it is able to be moved in the vertical direction.

The retaining stop 28 is intended to come into contact with the object 18.

Figure 2:
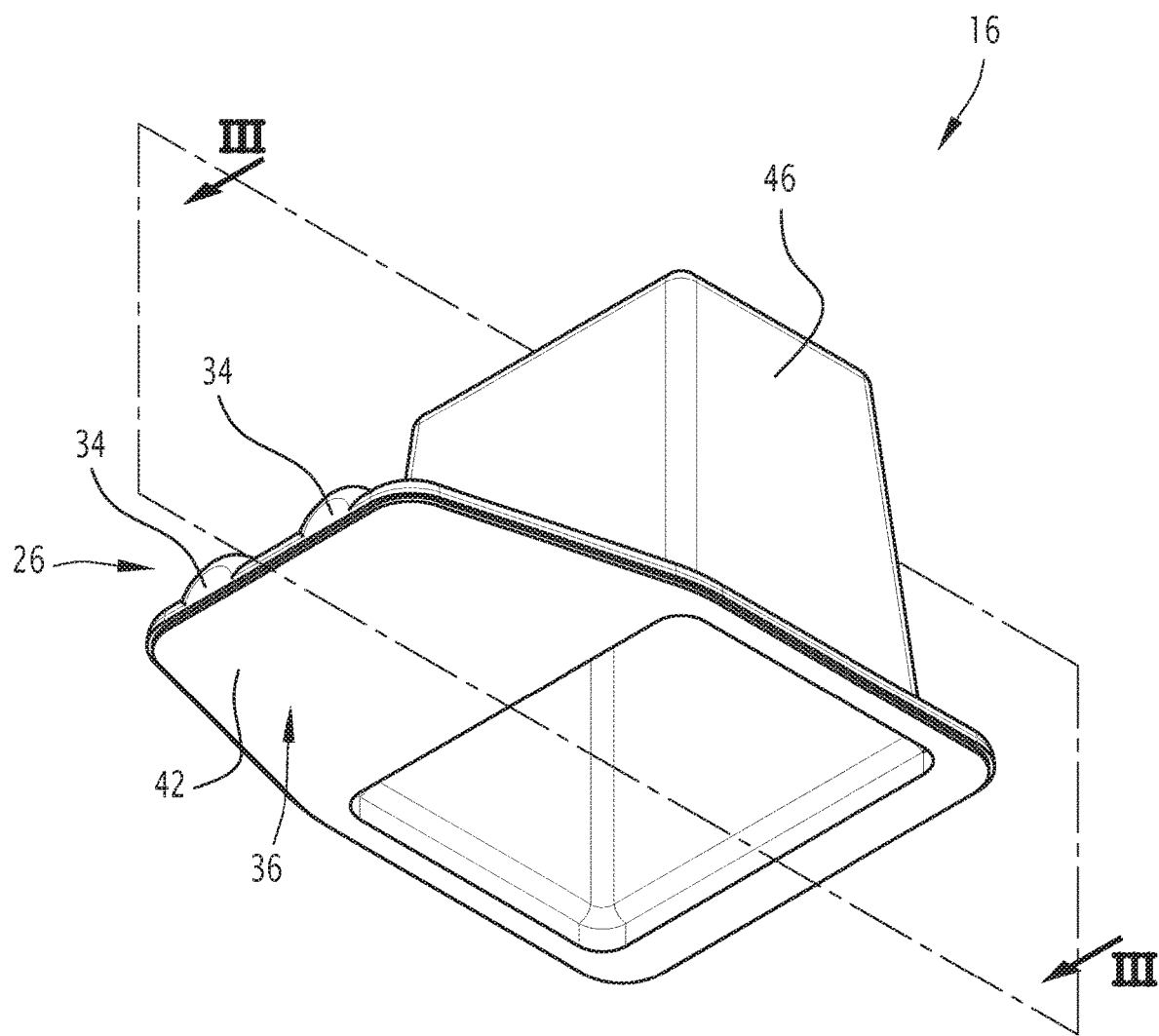
FIG. 2 shows the fixing piece of FIG. 1 in bottom perspective view, showing the fibrous fixing structure.

According to the first embodiment shown in FIGS. 1 to 3, the retaining stop 28 comprises a hollow wall 46. Advantageously, the hollow wall 46 has a frustoconical shape with a rectangular base. This configuration in particular allows several fixing pieces 16 to be stacked on top of one another for storage.

The hollow wall 46 has a thickness for example between 1 mm and 4 mm, and is advantageously substantially equal to 2 mm.

Advantageously, the hollow wall 46 has an upper face 50 defining at least one orifice 52. The presence of the orifice(s) 52 prevents air from accumulating in the hollow wall 46 when the fixing pieces 16 are stacked, or sub-atmospheric pressure in the hollow wall 46 when the stacked fixing pieces 16 are detached from one another, so as to facilitate the storage of the fixing pieces 16.

Advantageously, the storage assembly 10 comprises a plurality of fixing pieces 16 that are independent of one another, as illustrated in FIG. 1. The fixing pieces 16 define an object receiving space 56 between them. The object 18 is intended to be arranged in the receiving space 56 and in direct contact with the stop 28 of the fixing pieces 16. The fixing pieces 16 surround the object 18.

In a variant of the first and second fibers 22, 38 described above, the fibrous covering 12 and the fibrous fixing structure 36 are of the "Velcro"® type. They comprise fibrous loops and fibrous hooks, able to engage in one another to ensure the fixing.

The method for immobilizing at least one object 18 on a fibrous covering 12 in a motor vehicle using fixing piece(s) 16 will now be described.

First, the fibrous covering 12 is present in the bottom of the vehicle. At least one fixing piece 16 is provided.

The lower surface 32 of the fixing piece 16 is oriented toward the fibrous covering 12.

Then, each fixing piece 16 is fixed on the fibrous covering 12 by applying the fibrous structure 36 on the fibrous covering 12. To that end, according to the exemplary embodiment where the fibrous covering 12 comprises a plurality of first fibers 22 and the fixing structure 36 comprises a plurality of second fibers 38, the first and second fibers 22, 38 are intertwined so as to fix the fibrous structure 36 on the fibrous covering 12.

The fibrous covering 12 and the fibrous fixing structure 36 are devoid of adhesive, and the fixing of the fibrous structure 36 on the fibrous covering 12 is done exclusively by the intertwining of the first and second fibers 22, 38.

According to another example where the fibrous covering 12 and the fibrous fixing structure 36 are of the "Velcro"® type, the fibrous structure 36 is fixed on the fibrous covering 12 by arranging the or each fixing piece 16 on the fibrous covering 12, then applying pressure in the substantially vertical direction on each fixing piece 16.

Next, the object 18 is arranged bearing on the upper surface 30 of the plate 26 while being wedged against the or each stop 28. The object 18 is then maintained horizontally on the fibrous covering 12. Additionally, the weight of the object 18 increases the friction force between the each fixing piece 16 and the fibrous covering 12. The arrangement of the object 18 on the or each fixing piece 16 improves the fixing of the or each fixing piece 16 on the fibrous covering 12.

According to the embodiment where the storage assembly 10 comprises a plurality of fixing pieces 16, the fixing pieces 16 are successively fixed on the fibrous covering 12 in order to define a receiving space 56 between the stops 28. The object 18 is next arranged in the receiving space 56 while being in direct contact with the stop 28 of the fixing pieces 16, so as to be maintained between the stops 28 on the fibrous covering 12.

With the example described above, the fixing of objects 18 on the fibrous covering 12 is simplified. Indeed, in order to immobilize the objects 18 on the fibrous covering 12, it suffices to arrange the fixing pieces 16 on the fibrous covering 12, then to arrange the object on the upper surface 30 of the plate 26, without using complicated additional means. Furthermore, the detachment of the objects 18 and fixing pieces 16 from the fibrous covering 12 is also made simpler.

Figure 4:
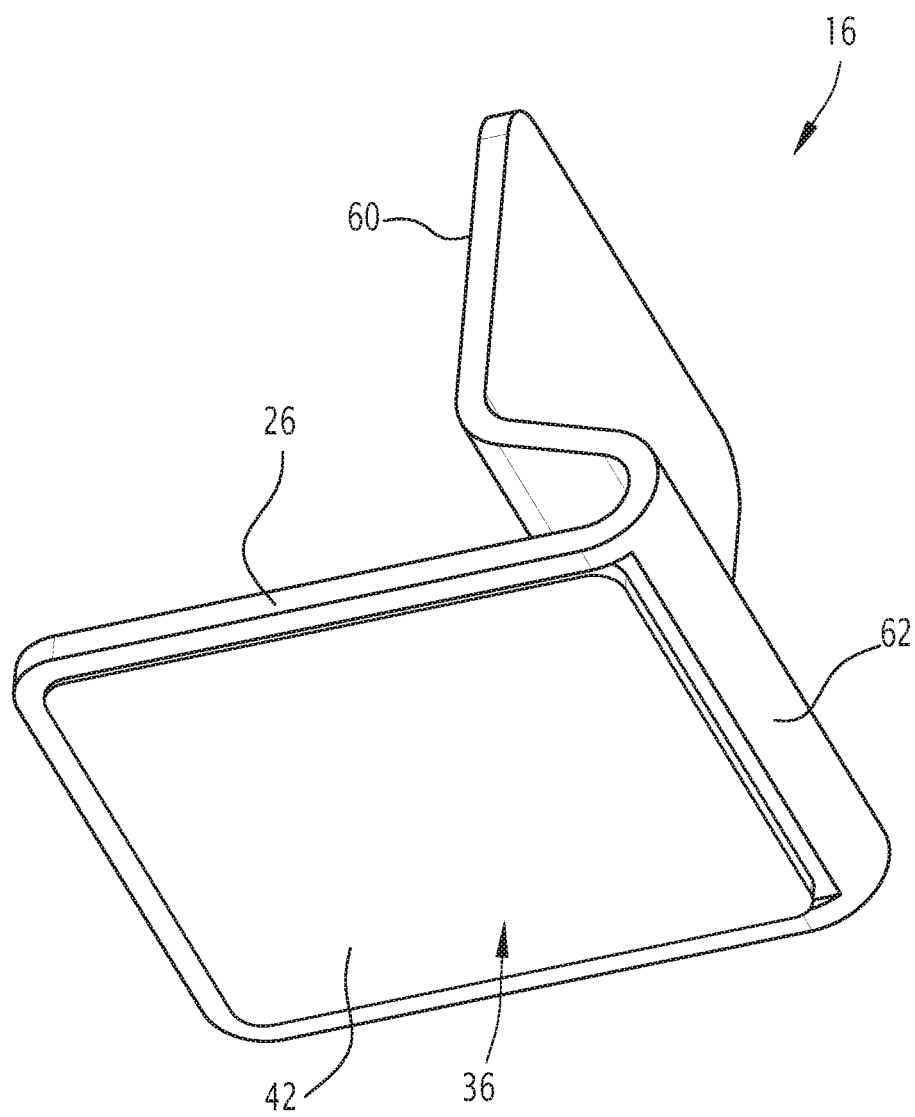
FIG. 4 illustrates a fixing piece according to a second embodiment of the invention in bottom perspective view.
Figure 5:
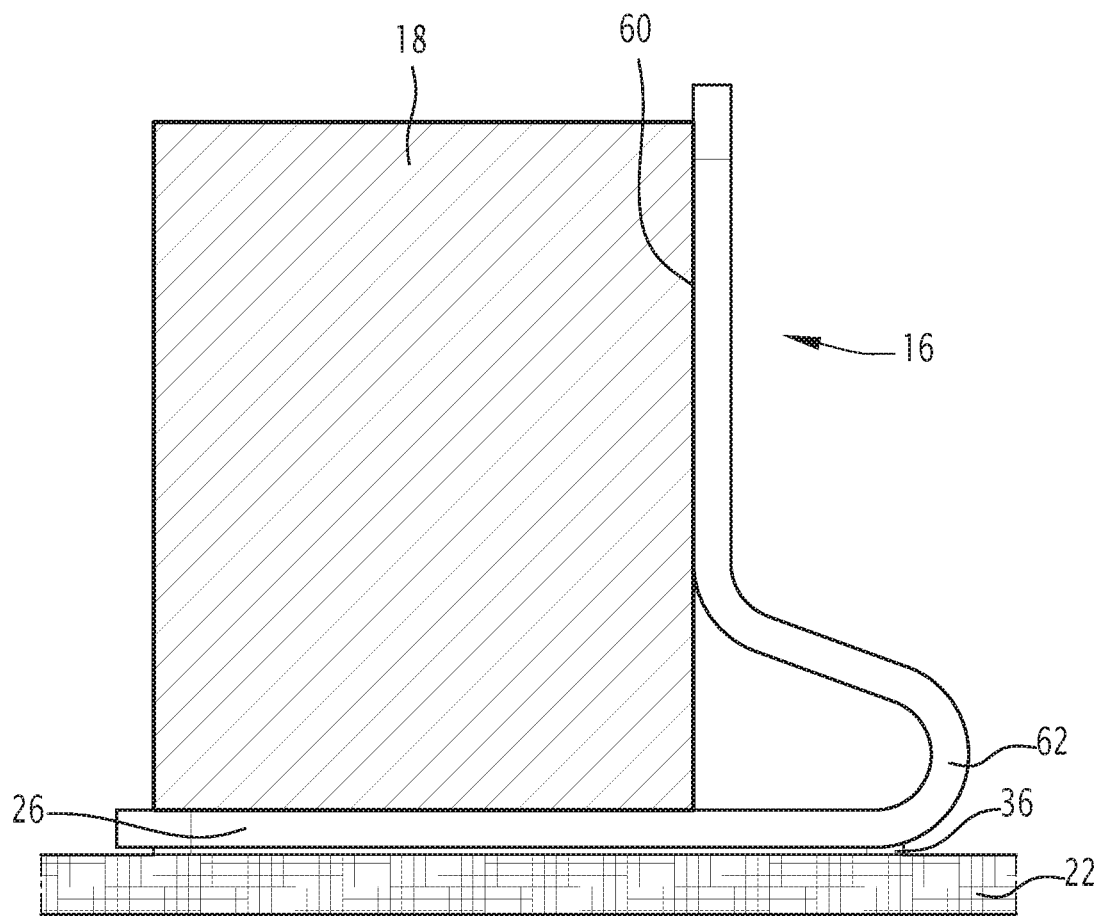
FIG. 5 is a sectional view of a storage assembly comprising the fixing piece of FIG. 4.

According to the second embodiment shown in FIGS. 4 to 5, the retaining stop 28 comprises a retaining surface 60 and an anti-tipping part 62 connecting the plate 26 and the retaining surface 60.

The retaining surface 60 extends substantially in the vertical direction. It is intended to come into direct contact with the object 18 to be retained. The retaining surface 60 defines a receiving space 56 having a surface smaller than or equal to the surface of the plate 26.

The anti-tipping part 62 extends at the foot of the retaining surface 60, away from the receiving space 56. It prevents the tipping of the retaining surface 60 away from the receiving space 56.

The invention claimed is:

1. An object storage assembly for a motor vehicle, comprising:
    a fibrous covering, intended to form an object support surface; and
    a fixing piece, intended to immobilize at least one object on the fibrous covering, the fixing piece comprising:
        a plate defining an upper surface and a lower surface configured to be oriented toward the fibrous covering, the upper surface being intended to come into contact with the object, and
        at least one object retaining stop protruding from the upper surface, the or each retaining stop being configured to maintain the object horizontally, wherein the or each retaining stop comprises a hollow wall having an upper face defining at least one orifice, wherein the hollow wall comprises an opening opposite the upper face and the hollow wall defines an open cavity communicating with the opening and the orifice,
        the lower surface comprising a fibrous fixing structure configured to fix the fixing piece on the fibrous covering, the lower surface of the fixing piece being fixed on the fibrous covering, and
        wherein the at least one object retaining stop of the fixing piece is configured to keep the at least one object in position, wherein the fibrous covering comprises a plurality of first fibers, and the fibrous fixing structure comprises a plurality of second fibers, the first and second fibers being configured to be intertwined to fix the fixing piece on the fibrous covering, wherein the first and second fibers are identical.

2. The fixing piece according to claim 1, wherein the lower surface comprises a rim defining a protruding region of the stop, the fibrous fixing structure being arranged on the protruding region.

3. The object storage assembly according to claim 1, wherein the density of the first and second fibers is between 0.05 g/cm³ and 1.5 g/cm³.

4. The object storage assembly according to claim 1, wherein the height of the first and second fibers is between 2 mm and 5 mm.

5. The object storage assembly according to claim 1, wherein the linear density of the first and second fibers is between 6.7 dtex and 35 dtex.

6. The object storage assembly according to claim 1, wherein the fibrous covering comprises a substrate layer, the first fibers being fixed on the substrate layer, the first fibers, respectively the second fibers, being substantially perpendicular to the substrate layer, respectively to the lower surface of the plate.

7. The object storage assembly according to claim 1, comprising a plurality of fixing pieces that are independent of one another, the fixing pieces defining a receiving space, the object being intended to be arranged in the receiving space and in direct contact with the retaining stop of the fixing pieces.

8. A method for immobilizing at least one object on a fibrous covering in a motor vehicle, the method comprising the following steps:
providing at least one fixing piece, the fixing piece comprising:
a plate defining an upper surface and a lower surface, the lower surface comprising a fibrous fixing structure;
at least one object retaining stop protruding from the upper surface, wherein the or each retaining stop comprises a hollow wall having an upper face defining at least one orifice, wherein the hollow wall comprises an opening opposite the upper face and the hollow wall defines an open cavity communicating with the opening and the orifice;
orienting the lower surface toward the fibrous covering;
fixing each fixing piece on the fibrous covering by applying the fibrous structure on the fibrous covering; and
keeping the object horizontal on the fibrous covering by contact of the object with the upper surface of the plate and the or each retaining stop, wherein the at least one object retaining stop of the fixing piece is configured to keep the at least one object in position, wherein the fibrous covering comprises a plurality of first fibers, and the fibrous fixing structure comprises a plurality of second fibers, the first and second fibers being configured to be intertwined to fix the fixing piece on the fibrous covering, wherein the first and second fibers are identical.

9. The immobilization method according to claim 8, the fibrous covering comprising a plurality of first fibers, the fibrous fixing structure comprising a plurality of second fibers, the method comprising immobilizing at least one fixing piece on the fibrous covering by intertwining of the first and second fibers.

10. The immobilization method according to claim 8, comprising providing a plurality of fixing parts and arranging them on the fibrous covering in order to define a receiving space between the retaining stops, the method comprising arranging the object in the receiving space, the object being in direct contact with the retaining stop of the fixing pieces, so as to keep the object on the fibrous covering.

11. An object storage assembly for a motor vehicle, comprising:
a fibrous covering, intended to form an object support surface; and
a fixing piece, intended to immobilize at least one object on the fibrous covering, the fixing piece comprising:
a plate defining an upper surface and a lower surface configured to be oriented toward the fibrous covering, the upper surface being intended to come into contact with the object, and
at least one object retaining stop protruding from the upper surface, the or each retaining stop being configured to maintain the object horizontally,
the lower surface comprising a fibrous fixing structure configured to fix the fixing piece on the fibrous covering, the lower surface of the fixing piece being fixed on the fibrous covering,
wherein the fibrous covering comprises a plurality of first fibers, and the fibrous fixing structure comprises a plurality of second fibers, the first and second fibers being configured to be intertwined to fix the fixing piece on the fibrous covering, and wherein the first and second fibers are identical.

12. An object storage assembly for a motor vehicle, comprising:
a fibrous covering, intended to form an object support surface, wherein the fibrous covering comprises a substrate layer; and
a fixing piece, intended to immobilize at least one object on the fibrous covering, the fixing piece comprising:
a plate defining an upper surface and a lower surface configured to be oriented toward the fibrous covering, the upper surface being intended to come into contact with the object, and
at least one object retaining stop protruding from the upper surface, the or each retaining stop being configured to maintain the object horizontally,
the lower surface comprising a fibrous fixing structure configured to fix the fixing piece on the fibrous covering, the lower surface of the fixing piece being fixed on the fibrous covering,
wherein the fibrous covering comprises a plurality of first fibers, and the fibrous fixing structure comprises a plurality of second fibers, the first and second fibers being configured to be intertwined to fix the fixing piece on the fibrous covering, and wherein the first fibers are fixed on the substrate layer, with the first fibers, respectively the second fibers, being substantially perpendicular to the substrate layer, respectively to the lower surface of the plate.

* * * * *